3,211,802
CATALYTIC ALKYLATION PROCESS
Rolland E. Dixon and Fred T. Sherk, Bartlesville, Okla., assignors to Phillips Petroleum Company, a corporation of Delaware
Filed Aug. 9, 1962, Ser. No. 215,959
4 Claims. (Cl. 260—683.45)

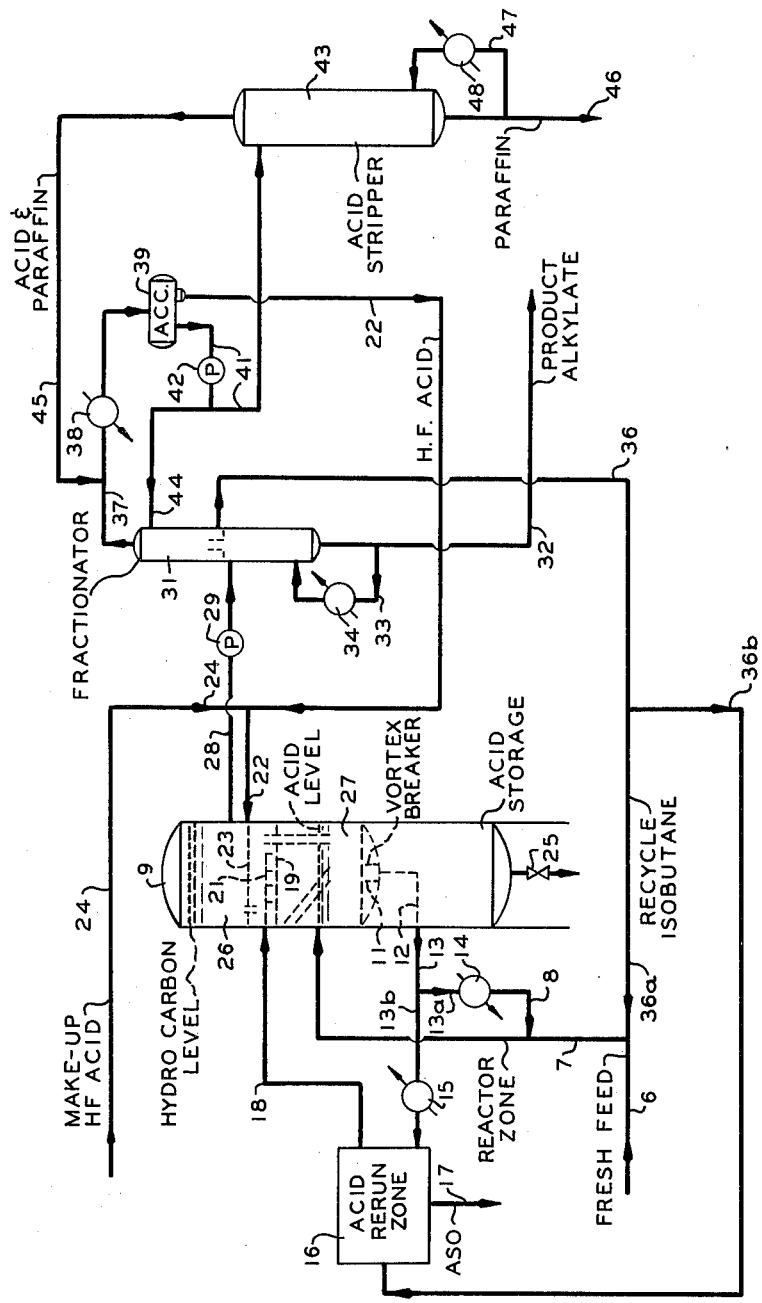

This invention relates to the catalytic alkylation of hydrocarbons. In one aspect it relates to increasing the yield and quality of product alkylate by regulation of the acid soluble oil content of the hydrofluoric acid catalyst employed.

In the alkylation of an isoparaffin and an olefin, for example, alkylation by isobutane of propylene or butylene, using hydrofluoric acid as catalyst, the percentage of acid soluble oils (A.S.O.) in the acid catalyst, has been found to have a direct effect upon the quality, as indicated by research octane number, for example, of the alkylate produced. It has been observed that the highest quality alkylate is produced from HF of relatively high A.S.O. content. Concurrently, larger quantities of organic fluorides are produced, according to the following reaction:

Olefin+HF (high in A.S.O.)→Organic fluoride

The presence of acid (high in A.S.O.) inhibits the following desired secondary reaction:

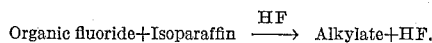

Organic fluoride+Isoparaffin $\xrightarrow{\text{HF}}$ Alkylate+HF.

Thus, larger quantities of organic fluorides remain unconverted in alkylate, thereby decreasing the concentration of HF in the acid phase of the reactor effluent settling zone. Thus, the A.S.O. content of the acid phase increases rapidly. Further, the presence of HF, abnormally high in A.S.O., can lead to a condition, which in the event of a process upset, such as a sudden variation in the fresh feed composition, can result in the production of excessive quantities of organic fluorides, with little alkylate production.

It is, therefore, an object of the present invention to increase the yield and quality of alkylate produced in the HF catalyzed alkylation by an isoparaffin of an olefin.

It is a further object of this invention to control the amount of organic fluorides appearing in the hydrocarbon phase of an alkylation reaction effluent.

It is still another object to minimize the amount of HF catalyst consumed in the production of an alkylate.

Other aspects, objects, and the several advantages of the invention will be come apparent from a study of the disclosure, the drawing, and the appended claims to the invention.

According to the present invention, there is provided a method for increasing quality and yield of product alkylate in the HF catalyzed alkylation of an isoparaffin by an olefin, wherein HF acid substantially free of A.S.O. content is injected at a first level into the upper hydrocarbon phase of an alkylation reaction effluent retained in a phase separation zone. In a second embodiment, additional HF acid low in A.S.O. content is injected at a second and perferably lower level into the upper hydrocarbon phase of said alkylation reaction effluent. In each embodiment, there is simultaneous facilitation of the formation of higher quality alkylate, and minimization of the presence of organic fluorides in the alkylation effluent.

The process of this invention can be conveniently conducted in suitable apparatus comprising means for alkylating by isoparaffin of an olefin, in the presence of an HF catalyst; a vessel means communicating with the alkylation means, said vessel means further comprising a preferably vertically elongated cylindrical shell adapted for pressure operation; a first contacting zone, for example a tray or trays, disposed transverse of said vessel and located below a first opening in said shell; a second contacting zone similarly disposed and located below said first tray and below a second opening; first conduit means for introducing catalyst low in acid soluble oils at said first opening on said vessel means, adjacent the separated hydrocarbon phase; a second conduit means for withdrawing a stream from said hydrocarbon phase; a fractionation zone communicating with the downstream end of said second conduit means; third conduit means for recovering product alkylate from the kettle portion of said fractionation zone; fourth conduit means for withdrawing a stream from the separated acid phase; an acid rerun zone communicating with the downstream end of said fourth conduit means; and fifth conduit means for passing rerun acid from said rerun zone to said second opening on said vessel means, adjacent the separated hydrocarbon phase.

The alkylation reaction is carried out with the hydrocarbon reactants in the liquid phase; however, the reactants need not be normally liquid hydrocarbons. The reaction conditions can vary in temperature from sub-zero temperatures to temperatures as high as several hundred degrees Fahrenheit, and can be carried out at pressures varying from atmospheric to as high at 1000 p.s.i., and higher. A variety of alkylation catalysts can be employed in the alkylation reaction, including well-known catalysts, such as sulfuric acid, hydrofluoric acid, phosphoric acid; metal halides, such as aluminum chloride, aluminum bromide, etc., and other liquid alkylation catalysts. While generally applicable to the alkylation of hydrocarbons, the present invention is particularly effective for the alkylation of low boiling olefins like ethylene, propylene, butenes, isobutylene, pentenes, etc., with saturated branched chain paraffins, such as isobutane, in the presence of hydrofluoric acid. In the alkylation of isoparaffins and olefins, a substantial molar excess of isoparaffin to olefin is employed, usually to provide a feed ratio in excess of 1:1, usually from about 4:1 to about 20:1 and preferably about 10:1 to 15:1. The reaction zone is maintained under sufficient pressure to ensure that the hydrocarbon reactants and alkylation catalysts are in the liquid phase. The temperature of the reaction will vary with the reactants and with the catalysts employed, but generally ranges from between about −40° F. to about 150° F.

Referring now to the drawing, there is now described a specific example of an operation, according to the present invention. An alkylatable hydrocarbon, such as propylene or butylene, and an alkylating compound, such as isobutane, admixed in suitable proportions passes as fresh feed via conduit 6 to reaction conduit 7. HF catalyst enters conduit 7 via conduit 8. As the acid catalyst and hydrocarbon reactants come in contact, reaction between the olefin and isoparaffin occurs, with the formation of higher molecular weight materials of high octane value. The reaction being exothermic, the temperature of the acid and reactants increases as the reaction mixture moves upwardly through conduit 7. Within a very short period of time, usually on the order of 0.1 to 30 seconds, the alkylation reaction is completed, after which reaction effluent containing hydrocarbon product (alkylate), acid catalyst, and unreacted feed hydrocarbons passes from conduit 7 into the upper portion of phase separation vessel 9. A vertically elongated cylindrical shell, suitable for pressure operation up to 150 p.s.i.a., is preferred. This vessel is suitably 6½' in diameter and about 55' in height. A vortex breaker 11 is disposed in the lower portion of vessel 9, and a conduit 12 communicates therefrom within an opening in the side of the vessel.

External conduit 13 splits, passing a stream of acid phase via conduit 13a, thru cooler 14 to HF feed conduit 8.

Acid phase stream 13b passes to an acid rerun zone 16, suitably a stripping tower, wherein said soluble oils (A.S.O.) are separated therefrom, and withdrawn from the system via conduit 17. Rerun acid, now substantially reduced in A.S.O. content to a range of 0.1 to 4 weight percent, passes back via conduit 18 into the upper portion of vessel 9 adjacent the hydrocarbon phase, wherein it is sparged downwardly onto a rigid, transversely disposed contacting tray 19, via nozzles 21. Concurrently, HF acid, substantially free of A.S.O. content, that is not to exceed 0.5 weight percent, is introduced via conduit 22 into vessel 9 onto a second and higher contacting tray 23. Fresh make-up HF acid is introduced into conduit 22, as required, from conduit 24. It will be observed that the liquids introduced into vessel 9 segregate into an upper hydrocarbon phase 26 and a lower acid phase 27. The lowest portion of vessel 9, below acid outlet conduit 12, may serve as an acid storage chamber, or other process vessel, with at least one valved opening 25.

A portion of hydrocarbon phase 26, with a significantly reduced organic fluoride and/or acid soluble oils content, is drawn through conduit 28, having pump 29 disposed therein, to the feed tray of a fractionator 31. Product alkylate, and some unseparated n-butane, is drawn from the kettle portion of tower 31, via conduit 32. A side stream 33 is drawn off conduit 32, heated in exchanger 34, to reboil the kettle of fractionator 31. A side stream 36 is drawn from tower 31 comprising unreacted isobutane which is recycled to reaction conduit 7, and also to acid rerun zone 16, by conduit 36b.

Overhead vapors from fractionator 31, comprising light paraffin hydrocarbons, particularly propane and HF, pass via conduit 37, cooler 38, accumulator 39, conduit 41, having pump 42 therein, to an acid stripper 43. Side conduit 44 recycles a portion of the condensed overhead to reflux fractionator 31. Condensed separated HF, being essentially free of A.S.O., passes from accumulator 39 into conduit 22, and is fed to phase separator 9. The overhead from acid stripper 43, comprising a mixture of light hydrocarbon and HF, passes via conduit 45 back to fractionator overhead conduit 37. Substantially pure light hydrocarbon is withdrawn from the kettle portion of stripper 43 via conduit 46. A side stream 47, having heater 48 disposed therein, reboils the stripper.

The following material balance, as Table I, is presented in illustration of an application of the invention on a commercial scale.

Enumeration of preferred temperatures and pressures for certain of the process components are set forth in Tables II and III, respectively.

TABLE II

*Temperatures, ° F.*

Phase separator 9:
    Section 26 _____ —
    Section 27 _____ —
    Feed 37 _____ 82
Cooler 14 outlet _____ 80
Rerun zone 16:
    (top) _____ 275
    (bottom) _____ 300
Fractionator 31:
    (top) _____ 113
    (bottom) _____ 402
Acid stripper 43:
    (top) _____ 110
    (bottom) _____ 130
Heater 15:
    In _____ 105
    Out _____ 300

TABLE III

*Pressures, p.s.i.a.*

Separator 9 _____ 125
Rerun column 16 _____ 150
Fractionator 31 _____ 250
Stripper 43 _____ 280

Having thus illustrated our invention by providing a specific example thereof, it is to be understood that no undue limitations or restrictions are to be drawn therefrom. Reasonable variations and modifications are possible within the scope of the foregoing disclosure, drawing, and appended claims.

We claim:

1. A method for increasing the quality and yield of product alkylate in a hydrofluoric acid-catalyzed alkylation of an alkylatable hydrocarbon with an alkylating compound, comprising: introducing a liquid mixture comprising said alkylatable hydrocarbon and said alkylating compound and HF into a reaction zone; passing alkylation reaction effluent comprising HF, product alkylate, and unreacted reactants into a phase separation vessel to form an upper hydrocarbon phase and a lower acid phase; introducing hydrofluoric acid having not to exceed 0.5 weight percent acid-soluble oil content into said upper hydrocarbon phase at a first level; passing a stream from said hydrocarbon phase at a point above said first level to a fractionation zone, wherein product alkylate is recovered therefrom; passing a stream from said acid phase to a rerun zone to purify the same; and passing rerun HF acid having from 0.1 to 4 weight percent of A.S.O. content to said phase separation vessel to be introduced at a second level into said hydrocarbon phase below said first level.

TABLE I

*Stream (b.p.s.d.)[1]*

| Component | 6 | 13a | 36a | 13 | 13b | 17 | 18 | 28 | 32 | 36b | 22 | 46 |
|---|---|---|---|---|---|---|---|---|---|---|---|---|
| HF | | 42,300.0 | 0.7 | 42,384.6 | 84.6 | | 84.6 | 36.7 | | | 36.0 | |
| $C_2H_6$ | 1.0 | | 0.4 | | | | | 1.9 | | | .6 | 1.0 |
| $C_3H_8$ | 105.1 | 200.0 | 160.2 | 200.4 | 0.4 | | 7.9 | 259.3 | | 7.5 | 3.4 | 124.1 |
| $isoC_4H_{10}$ | 554.0 | 1,450.0 | 4,385.0 | 1,452.9 | 2.9 | trace | 210.5 | 4,598.0 | 3.5 | 207.6 | | 1.9 |
| $n\text{-}C_4H_{10}$ | 69.7 | 100.0 | 328.8 | 100.2 | 0.2 | | 15.8 | 414.1 | 69.7 | 15.6 | | |
| $C_5H_{12}+$ | | 150.0 | 67.8 | 150.3 | 0.3 | | 3.5 | 856.8 | 785.7 | 3.2 | | |
| $H_2O$ | | 900.0 | | 901.8 | 1.8 | trace | 1.8 | | | | | |
| ASO | | 2,400.0 | | 2,404.8 | 4.8 | 0.9 | 3.9 | | | | | |
| $C_2H_6$ | 190.0 | | | | | | | | | | | |
| $C_4H_8$ | 259.0 | | | | | | | | | | | |
| | 1,178.8 | 47,500.0 | 4,942.9 | 47,595.0 | 95.0 | 0.9 | 328.1 | 6,202.8 | 858.9 | 233.9 | 39.9 | 127.0 |

[1] Quantities are rounded to the nearest 10th of a barrel.

2. The process according to claim 1 wherein the overhead product from said fractionation zone comprises said HF introduced into said upper hydrocarbon phase at said first level.

3. An improved alkylation process comprising: introducing an isoparaffin, an olefin and hydrofluoric acid containing soluble oils into a reaction zone to form alkylate and organic fluorides; passing reaction zone effluent comprising alkylate, organic fluorides, hydrofluoric acid and unreacted isoparaffin into a separation vessel, having a plurality of contact zones in the upper portion thereof, to form an upper hydrocarbon phase and a lower acid phase; passing said acid phase to a re-run zone for removal of said soluble oils therefrom; passing re-run acid to a first contact zone within said hydrocarbon phase to cause further reaction of said organic fluorides and unreacted isoparaffin; passing substantially pure hydrofluoric acid to a second contact zone within said hydrocarbon phase and above said first contact zone to cause further alkylation reaction; and passing the twice contacted hydrocarbon phase to a fractionation zone to recover alkylate product.

4. An improved alkylation process comprising: introducing an isoparaffin, an olefin and hydrofluoric acid containing more than 4 weight percent soluble oils into a reaction zone to form alkylate and organic fluorides; passing reaction zone effluent comprising alkylate, organic fluorides, hydrofluoric acid and unreacted isoparaffin into a separation vessel, having a plurality of contact zones in the upper portion thereof, to form an upper hydrocarbon phase and a lower acid phase; passing said acid phase to a re-run zone for removal of said soluble oils therefrom; passing re-run acid containing less than 4 weight percent soluble oils to a first contact zone within said hydrocarbon phase to cause further reaction of said organic fluorides and unreacted isoparaffin; passing substantially pure hydrofluoric acid containing less than 0.5 weight percent soluble oils to a second contact zone within said hydrocarbon phase and above said first contact zone to cause further alkylation reaction; and passing the twice contacted hydrocarbon phase to a fractionation zone to recover alkylate product.

References Cited by the Examiner

UNITED STATES PATENTS

| | | | |
|---|---|---|---|
| 2,894,999 | 7/59 | Lawson | 260—683.48 |
| 2,990,437 | 6/61 | Berger | 260—683.48 |
| 3,080,438 | 3/63 | Sailors | 260—683.48 |
| 3,088,987 | 5/63 | Irvine | 260—683.61 |

ALPHONSO D. SULLIVAN, *Primary Examiner.*